US009253686B1

(12) United States Patent
Chaand et al.

(10) Patent No.: US 9,253,686 B1
(45) Date of Patent: Feb. 2, 2016

(54) CLUSTER-BASED WIRELESS-NETWORK TECHNOLOGY ASSIGNMENT

(71) Applicant: SPRINT COMMUNICATIONS COMPANY L.P., Overland Park, KS (US)

(72) Inventors: Anuja Chaand, Fairfax, VA (US); Gila Ghavami, Bethesda, MD (US); Aik Chindapol, Washington, DC (US)

(73) Assignee: Sprint Communications Company L.P., Overland Park, KS (US)

( * ) Notice: Subject to any disclaimer, the term of this patent is extended or adjusted under 35 U.S.C. 154(b) by 288 days.

(21) Appl. No.: 13/899,913

(22) Filed: May 22, 2013

(51) Int. Cl.
*H04M 1/00* (2006.01)
*H04W 28/16* (2009.01)
(52) U.S. Cl.
CPC ..................................... *H04W 28/16* (2013.01)
(58) Field of Classification Search
CPC ..... H04W 28/08; H04W 88/06; H04W 48/06; H04W 28/0247; H04W 76/025
USPC ........................... 455/451, 452.1, 452.2, 455
See application file for complete search history.

(56) References Cited

U.S. PATENT DOCUMENTS

| | | | |
|---|---|---|---|
| 2006/0019673 A1* | 1/2006 | Yagyu et al. | 455/454 |
| 2011/0244874 A1* | 10/2011 | Fodor et al. | 455/450 |
| 2012/0281587 A1* | 11/2012 | Yang | 370/252 |

* cited by examiner

*Primary Examiner* — Khai M Nguyen
*Assistant Examiner* — Dung Lam

(57) ABSTRACT

A method, system, and medium are provided for assigning wireless-network technologies to base stations within a base station cluster. A first set of base stations is associated to form a first base station cluster. Once associated into the base station cluster, the total estimated demand on each wireless-network technology is determined for each of the base stations in the cluster. The technology having the highest total estimated demand is also determined for each of the base stations in the cluster. A first RF channel in the cluster is assigned the technology for which the majority of the base stations in the cluster have the highest total estimated demand. This process is carried out for the remaining RF channels in the cluster.

19 Claims, 6 Drawing Sheets

CLUSTER-BASED WIRELESS-NETWORK TECHNOLOGY ASSIGNMENT

SUMMARY

A high level overview of various aspects of the invention is provided here for that reason, to provide an overview of the disclosure and to introduce a selection of concepts that are further described below in the detailed-description section below. This summary is not intended to identify key features or essential features of the claimed subject matter, nor is it intended to be used as an aid in isolation to determine the scope of the claimed subject matter.

In brief, and at a high level, this disclosure describes, among other things, computer-storage media, methods, and systems, for assigning wireless-network technologies (otherwise known as "technologies") to radio-frequency (RF) channels associated with a cluster of base stations. Base stations within a wireless-telecommunications-network (the "network") are aggregated into clusters based on, for example, the network's evaluation of key performance indicators associated with the base stations as well as an evaluation of base station topology. Once aggregated into clusters, an estimated demand on each technology for each base station in a particular cluster is determined. The technology having the highest demand for each base station in the cluster is determined, and a first RF channel in the cluster is assigned the technology for which the majority of the base stations in the cluster have the highest demand. The process is repeated for the remaining RF channels in the cluster. The assignment of technologies in a base station cluster may occur on a fixed schedule or be in response to, for example, changes in subscriber usage patterns and/or changes in mobile device characteristics associated with the base station cluster.

BRIEF DESCRIPTION OF THE DRAWINGS

Illustrative embodiments of the present invention are described in detail below with reference to the attached drawing figures, and wherein.

DETAILED DESCRIPTION

Figure 1:
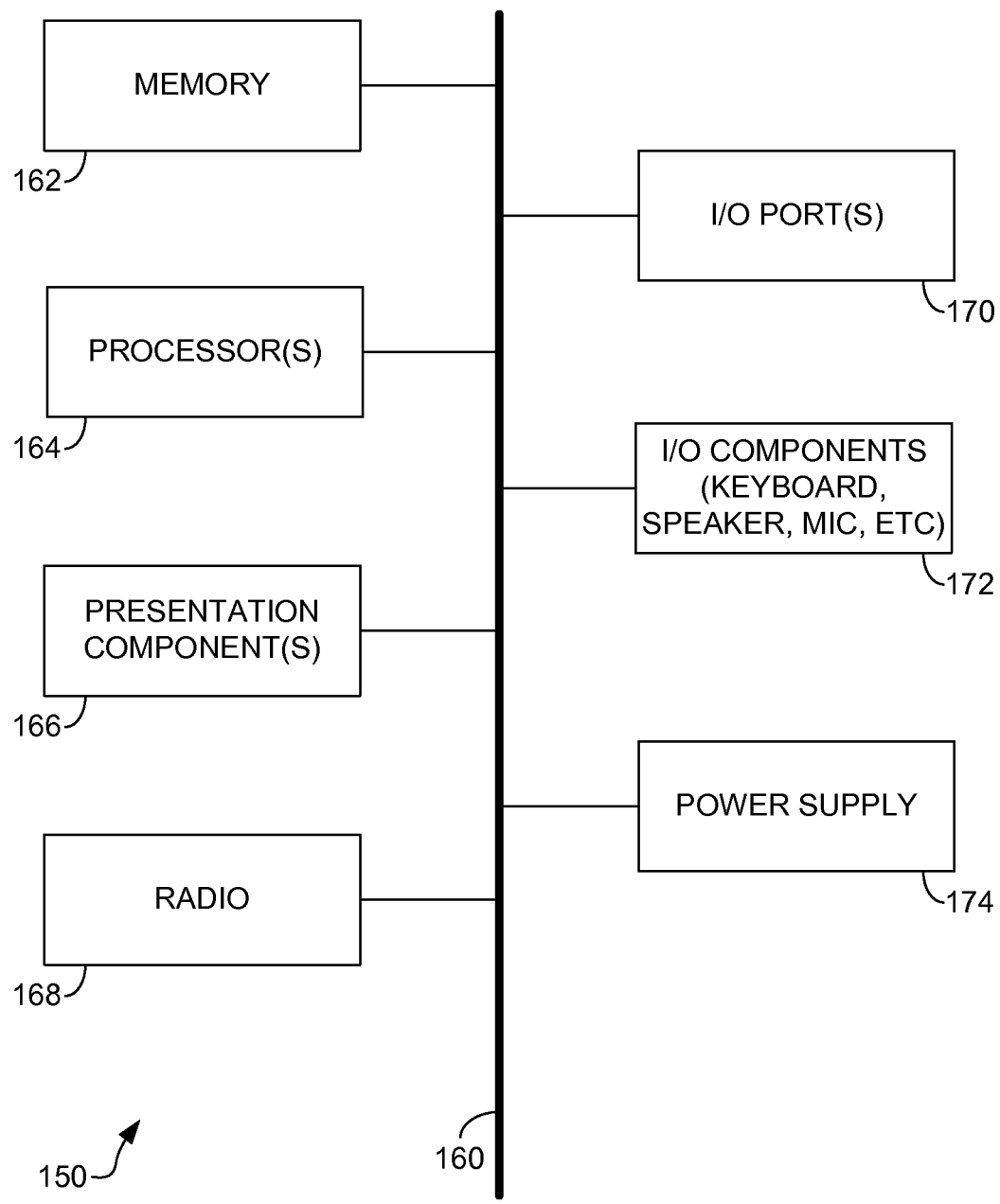
FIG. 1 depicts and exemplary mobile device according to an embodiment of the technology.

The subject matter of select embodiments of the present invention is described with specificity herein to meet statutory requirements. But the description itself is not intended to define what we regard as our invention, which is what the claims do. The claimed subject matter might be embodied in other ways to include different steps or combinations of steps similar to the ones described in this document, in conjunction with other present or future technologies. Terms should not be interpreted as implying any particular order among or between various steps herein disclosed unless and except when the order of individual steps is explicitly described.

Throughout this disclosure, several acronyms and shorthand notations are used to aid the understanding of certain concepts pertaining to the associated system and services. These acronyms and shorthand notations are intended to help provide an easy methodology of communicating the ideas expressed herein and are not meant to limit the scope of the present invention. The following is a list of these acronyms:

CDMA Code Division Multiple Access
EvDO Enhanced Voice-Data Optimized
IEEE-SA Institute of Electrical and Electronics Engineers Standards Association
GIS Geographic Information System
3GPP $3^{rd}$ Generation Partnership Project
GPRS General Packet Radio Service
GSM Global System for Mobile Communications
LTE Long-Term Evolution
RF Radio-Frequency
TDMA Time Division Multiple Access
WiMAX Worldwide Interoperability for Microwave Access Further, various technical terms are used throughout this description. An illustrative resource that fleshes out various aspects of these terms can be found in Newton's Telecom Dictionary, $27^{th}$ Edition (2012).

Embodiments of the present invention may be embodied as, among other things, a method, system, or set of instructions embodied on one or more non-transitory computer-readable or computer-storage media. Computer-readable media comprises physical storage devices and include both volatile and nonvolatile media, removable and nonremovable media, and contemplates media readable by a database, a switch, and various other network devices. By way of example, and not limitation, computer-readable media comprise media implemented in any method or technology for storing information. Examples of stored information include computer-useable instructions, data structures, program modules, and other data representations. Media examples include, but are not limited to computer-storage media such as information-delivery media, RAM, ROM, EEPROM, flash memory or other memory technology, CD-ROM, digital versatile discs (DVD), holographic media or other optical disc storage, magnetic cassettes, magnetic tape, magnetic disk storage, and other magnetic storage devices. These technologies can store data momentarily, temporarily, or permanently.

Examples of the present invention are directed toward methods, systems, and computer-storage medium for use in aggregating one or more base stations to form a base station cluster and adjusting technology assignments to RF channels associated with the base station cluster based on, for example, changes in calling/data usage patterns, network policy, and/or mobile device characteristics associated with the base station cluster. A group of base stations within a network are aggregated into a base station cluster based on, for example, the network's evaluation of key performance indicators associated with the base stations as well as an evaluation of base station topology. Once aggregated into the cluster, an estimated demand on each technology for each base station in the cluster is determined. The technology having the highest demand for each base station is determined, and a first RF channel in the cluster is assigned the technology for which the majority of the base stations in the cluster have the highest demand. The process is repeated for the remaining RF channels in the cluster.

In one aspect, a first set of base stations is associated together to form a first cluster of base stations. For each base station in the first cluster, a first step of determining total estimated demand for each technology carried by the each base station is executed. A second step of determining a technology having the highest total estimated demand is executed for each of the base stations. A third step is executed of assigning to a first RF channel in the cluster a technology for which the majority of the base stations in the cluster have the highest total estimated demand. Additionally, a fourth step of executing the first, second, and third steps for the remaining RF channels in the cluster is also carried out.

In a second aspect, a base station within the network communicates to the network total traffic load across the base station's RF channels for each technology carried by the base station. The base station receives a technology reassignment command from the network, and, in response to the command, the base station reassigns to at least a first RF channel a technology different from the technology currently being carried by the RF channel.

In a third aspect, a plurality of base station clusters is defined; each base station cluster comprises a set of base stations. Characteristics, such as mobile device characteristics and/or subscriber usage patterns, associated with each base station cluster are monitored to detect changes in the characteristics. Incident to detecting a change in characteristics for a first base station cluster, the following steps are initiated: 1) a first step of determining total estimated demand for each technology carried by each base station in the first cluster; 2) a second step of determining a technology having the highest total estimated demand for each of the base stations in the first cluster; 3) a third step of assigning to a first RF channel in the first cluster a technology for which the majority of the base stations in the first cluster have the highest total estimated demand; and 4) a fourth step of executing the first, second, and third steps for the remaining RF channels in the first cluster.

As used throughout this application, the term "wireless-network technology" or "technology" is meant to encompass different wireless-network standards developed by organizations such as the IEEE-SA, 3GPP, and the like. Such technologies are numerous but exemplary technologies include WiMAX, EvDO, CDMA, and LTE. These different technologies may be optimized for different usages. For example, CDMA is optimized for voice calls, while EvDO and LTE are optimized for data usage.

As way of background, networks are allocated a specified amount of RF spectrum bandwidth which is carried by base station RF channels. Because of the limited amount of bandwidth allocated to the networks, it is important for each network to efficiently use its allocated RF bandwidth. Traditionally, networks have made a uniform and fixed assignment of technologies across all base station RF channels within a market sector. Thus, for example, all base stations within the market sector may have CDMA assigned to their first and second RF channels, EvDO assigned to a third RF channel, and LTE assigned to the remaining RF channel. Different technologies are used in an effort to support newer smart phones with their larger rates of data usage as well as older mobile devices designed primarily for voice calls.

However, while the initial assignment of technologies may have met network needs at the time of the assignment, changes in, for example subscriber usage patterns, subscriber mobile device characteristics, as well as network policy may make the initial assignment of technologies rapidly obsolete. The result is that the network's limited RF bandwidth is no longer being effectively utilized, and the subscriber's network experience is degraded due to dropped calls, blocked calls, and the like.

Turning now to FIG. 1, a block diagram of an illustrative communications device or mobile device is provided and referenced generally by the numeral 150. Although some components are shown in the singular, they may be plural. For example, the communications device 150 might include multiple processors or multiple radios, etc. As illustratively shown, the communications device 150 includes a bus 160 that directly or indirectly couples various components together including memory 162, a processor 164, a presentation component 166, a radio 168, input/output ports 170, input/output components 172, and a power supply 174.

The memory 162 might take the form of memory components previously described. Thus, further elaboration will not be provided here, only to say that the memory component 162 can include any type of medium that is capable of storing information (e.g., a database). A database can be any collection of records. In one embodiment, the memory 162 includes a set of embodied computer-executable instructions that, when executed, facilitates various aspects disclosed herein. These embodied instructions will variously be referred to as "instructions" or an "application" for short.

The processor 164 might actually be multiple processors that receive instructions and process them accordingly. The presentation component 166 includes the likes of a display, a speaker, as well as other components that can present information (such as a lamp (LED), or even lighted keyboards).

The radio 168 facilitates communication with a wireless-telecommunications-network. Illustrative wireless-telecommunications technologies include CDMA, EvDO, GPRS, TDMA, GSM, WiMax technology, LTE, LTE Advanced and the like. In some embodiments, the radio 168 might also facilitate other types of wireless communications including Wi-Fi®, Bluetooth® communications, GIS communications, and other near-field communications.

The input/output port 170 might take on a variety of forms. Illustrative input/output ports include a USB jack, stereo jack, infrared port, proprietary communications ports, and the like. The input/output components 172 include items such as keyboards, microphones, speakers, touch screens, and any other item usable to directly or indirectly input data into the communications device 150. Power supply 174 includes items such as batteries, fuel cells, or any other component that can act as a power source to power the communications device 150.

Figure 2:
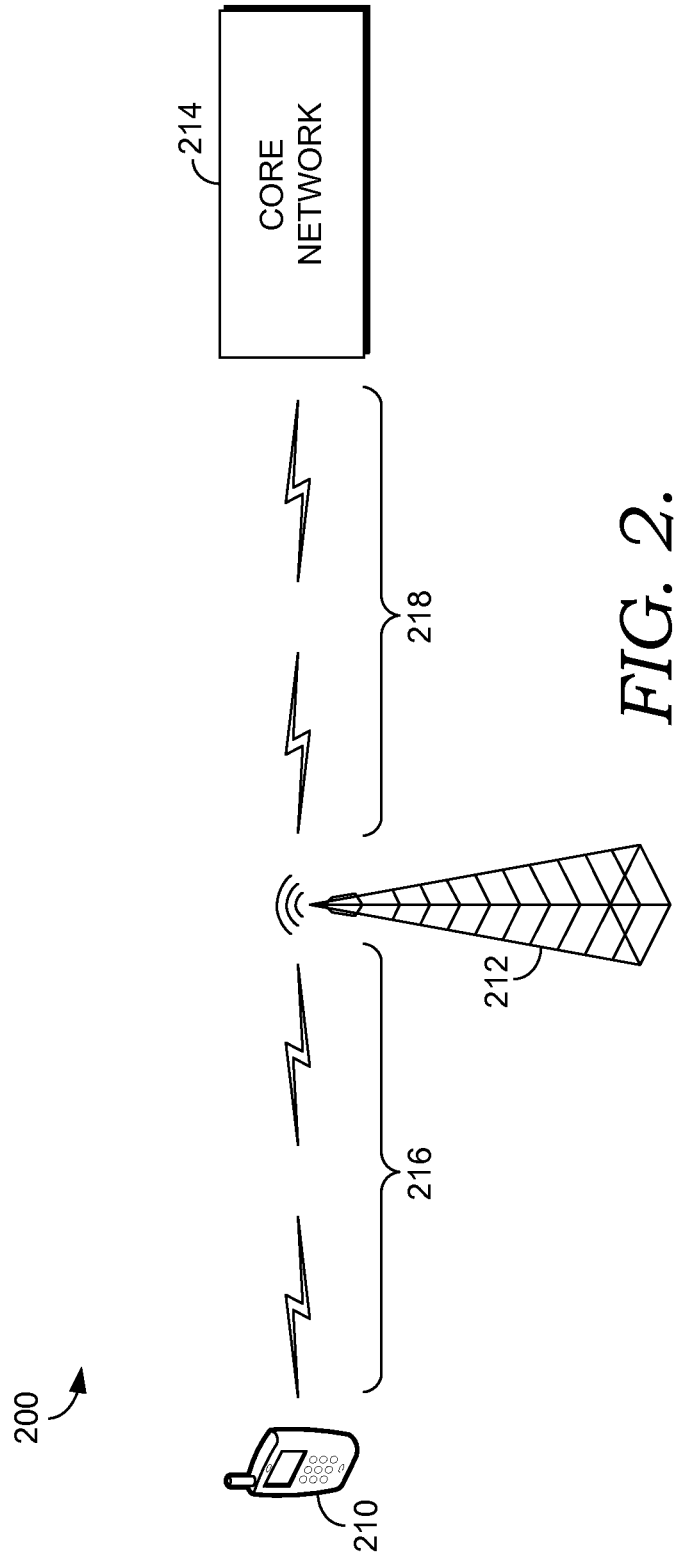
FIG. 2 depicts an illustrative relationship between a mobile device, a base station, and a wireless-telecommunications-network suitable for practicing an embodiment of the technology.

FIG. 2 depicts an illustrative wireless-telecommunications network (the "network") that is referenced generally by the numeral 200. The network 200 includes a mobile device 210, a first base station 212, and a core network 214. The illustrative network 200 shown in FIG. 2 is merely an example of one suitable networking environment and is not intended to suggest any limitation as to the scope of use or functionality of embodiments of the present invention. Neither should the network 200 be interpreted as having any dependency or requirement related to any single module/component or combination of modules/components illustrated therein. The network 200 depicted in FIG. 2 is simplified for ease of discussion. It is contemplated that the network 200 may include multiple mobile devices 210 and base stations 212. Furthermore, the core network 214 is contemplated to include one or more components not shown.

The mobile device 210 may be the same as the communications device 150 of FIG. 1. The mobile device 210 may support multiple technologies such as CDMA, EvDO, TDMA, WiMax technology, LTE and the like. Alternatively, the mobile device 210 may support one type of technology such as LTE (LTE and/or LTE Advanced) or CDMA. Any and all such aspects, and any combination thereof, are contemplated as being within the scope of the invention. The mobile device 210 may subscribe to services offered by the core network 214. As such, the mobile device 210 may be in communication with the base station 212 via wireless-telecommunications links such as, for example, wireless-telecommunications link 216. The mobile device 210 may communicate with the base station 212 via the wireless-telecommunications link 216 to facilitate attachment of the mobile device 210 to the base station 212. Once attached, the mobile device 210 may also use the wireless-telecommunications link 216 to send and/or receive voice call information and/or data information as well as information concerning device capabilities.

The base station 212 includes hardware and bandwidth(s) of a specified frequency. Although the term "base station" is used throughout this application, equivalent terms may include radio access node, eNodeB, cell site, and Node B. The hardware includes, for example, the actual radio mast or tower, as well as antennas, transceivers, GPS receivers, electrical power sources, digital signal processors, control electronics, and the like that are associated with the radio tower. The RF spectrum bandwidth may comprise one or more RF channels. Each channel is capable of supporting different types of technology although only one type of technology is supported by a particular RF channel at a time. With respect to this application, the term "channel" refers to an upload spectrum and a download spectrum. The assignment of technologies to the different RF channels of the base station 212 is carried out by the core network 214. As described above, traditionally the assignment of technologies is static or fixed—after the assignments are made, the assignments generally remain unchanged.

Besides being in communication with the mobile device 210 via the wireless-telecommunications link 216, the base station 212 may be in communication with other base stations (not shown) in the network via additional telecommunications links (not shown) which may be wired or wireless to facilitate handoffs or handovers between the different base stations when the mobile device 210 moves from one base station to the next. The base station 212 may also communicate with the core network 214 via wired and/or wireless telecommunications links such as, for example, telecommunications link 218.

Exemplary communications to and from the base station 212 and the core network 214 using the telecommunications link 218 may include attachment requests communicated from the base station 212 to the core network 214, attachment authorizations communicated from the core network 214 to the base station 212, requests from the base station 212 to transfer an existing voice call from a first channel to a second channel, and transfer authorizations from the core network 214.

Other exemplary communications to and from the base station 212 and the core network 214 using the telecommunications link 218 may include an indication of dropped calls, blocked calls, and handoff activity across technologies communicated from the base station 212 to the core network 214, an indication of total traffic load on each technology associated with the base station 212 communicated from the base station 212 to the core network 214, reassignment commands communicated from the core network 214 to the base station 212, and the like.

The core network 214 may include one or more servers and data stores (not shown). The data stores may store data about the network's subscribers including information such as subscription plan information, preferred services for different types of user applications, data transmission limits, time and site restrictions, capabilities associated with the mobile device 210, and the like. For example, the parameters may specify that the mobile device 210 is an LTE-only device or that the mobile device 210 is capable of supporting multiple technologies.

Figure 3:
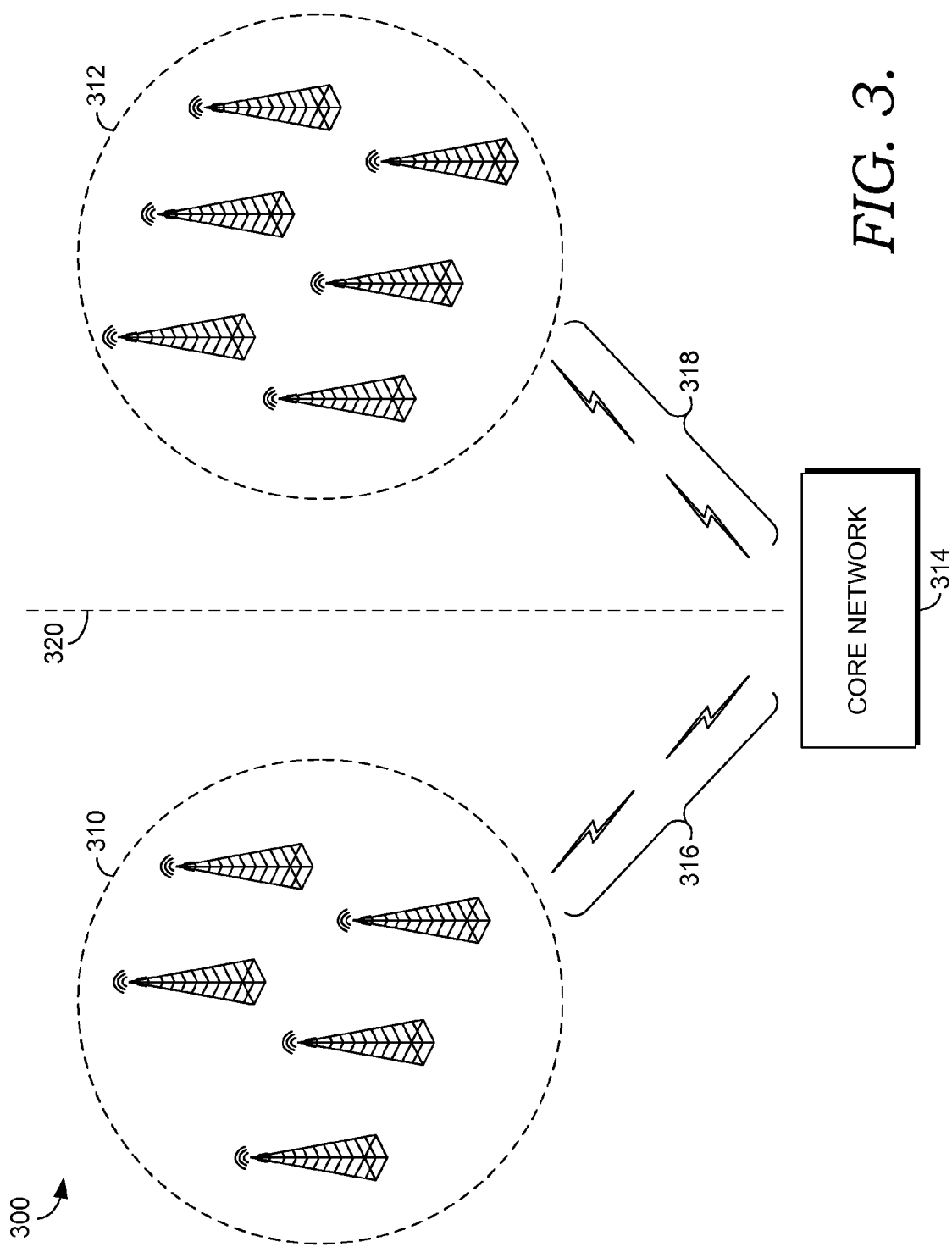
FIG. 3 depicts an illustrative arrangement of base station clusters suitable for practicing an embodiment of the technology.

Turning now to FIG. 3, FIG. 3 depicts an illustrative arrangement of base station clusters 310 and 312 associated with a core network 314 and is referenced generally by the numeral 300. Based on an evaluation of key performance indicators associated with each base station in the network 314 such as dropped calls, blocked calls, and/or handoff activity across technologies, an evaluation of usage patterns, as well as an evaluation of base station topology, the core network 314 aggregates or associates its base stations into clusters such as the base station cluster 310 and the base station cluster 312. Each cluster may contain a configurable number of base stations optimized to maximize the benefits of technology reassignment and minimize the potential disruptions due to the reassignments. In one exemplary embodiment, each cluster may contain between three and eight base stations. The number of base stations within each cluster may vary from cluster to cluster. Further, each base station within a cluster, such as the cluster 310, may carry the same number of RF channels. Alternatively, each base station may carry a different number of RF channels. Any and all such aspects, and any combination thereof, are contemplated as being within the scope of the invention.

The base station clusters 310 and 312 represent groups of base stations that generally share similar usage patterns. As used in this application, the term "usage patterns" is meant to encompass such things as the proportion of voice calls as compared to data calls, periods of peak use including peak voice use and peak data use, mobile device characteristics (e.g., device capability profiles), subscriber characteristics, and the like.

The base stations within each of the clusters 310 and 312 generally reside in a circumscribed geographic area and provide contiguous coverage to mobile devices traveling through the geographic area containing the clusters 310 or 312. A border 320 between the clusters 310 and 312 may be defined based on an evaluation of hand-off activity between the different base stations within the clusters 310 and 312. Hand-off activity between the base stations associated with the cluster 310 and the base stations associated with the cluster 312 should generally be minimal to avoid disruption to service in the event of a technology reassignment event involving the clusters 310 and 312. In other words, it would be undesirable to create a border between two base stations that have a large amount of hand-off activity. Instead, two base stations with a large amount of hand-off activity would be aggregated together in the same cluster.

The base stations within the clusters 310 and 312 communicate with the core network 314 using the telecommunications links 316 and 318 as described above. The base stations within the clusters 310 and 312 may utilize the links 316 and 318 to communicate to the core network 314 indications of key performance indicators as well as traffic loads across the technologies carried by the base stations. The core network 314 may use this information to reassign technologies associated with the base station RF channels—a process that will be explained in greater depth below. The reassignment may occur on a fixed schedule such as every hour, every week, or every month. Or the reassignment may be dynamic based on detected changes in usage patterns or network policy. Any and all such aspects, and any combination thereof, are contemplated as being within the scope of the invention.

Figure 4:
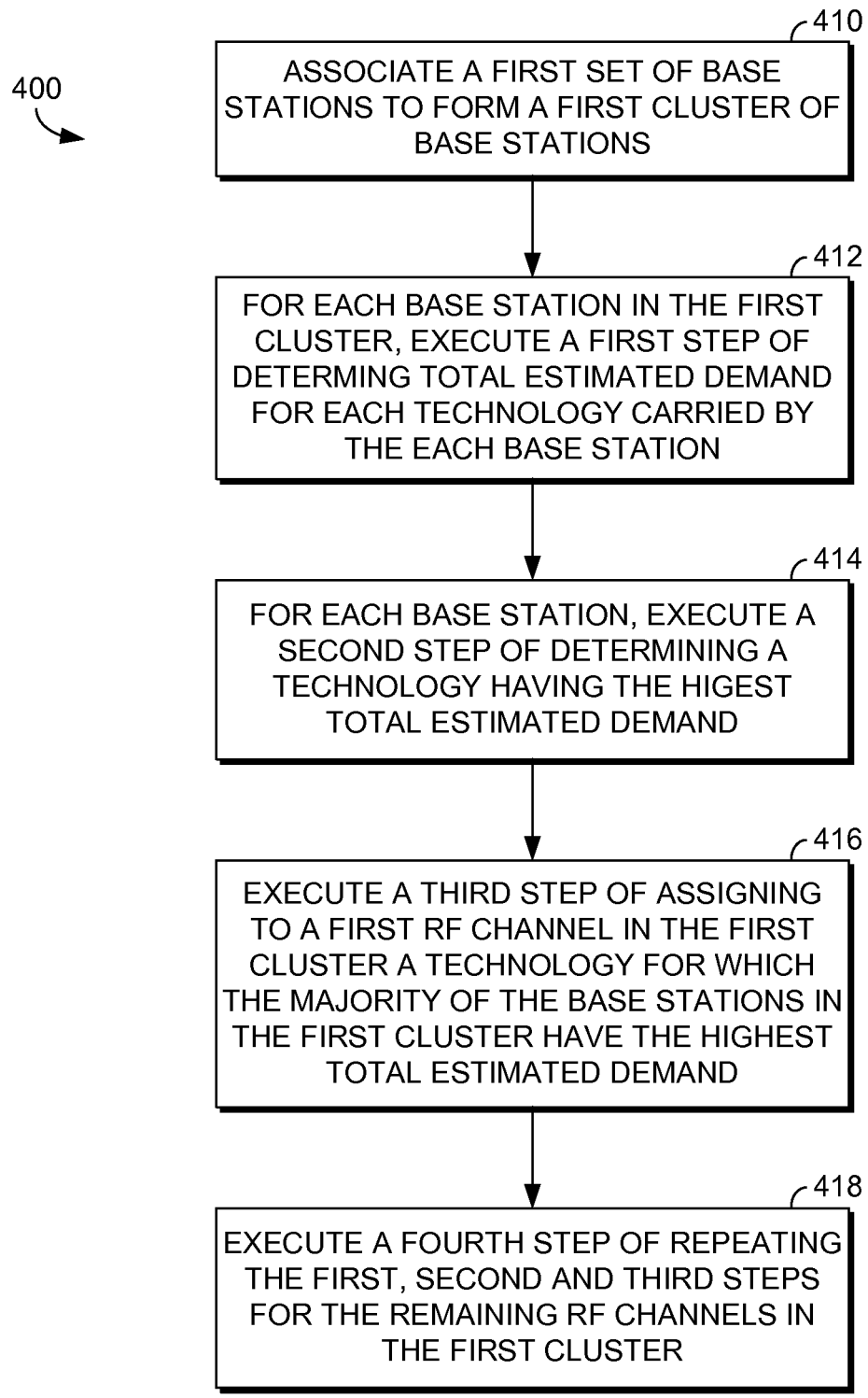
FIG. 4 depicts an illustrative flow diagram of an exemplary method of assigning wireless-network technologies to base station radio-frequency channels according to an embodiment of the technology.

Turning now to FIG. 4, a flow diagram is depicted of an exemplary method 400 of assigning technologies to base station RF channels. At a step 410, a first set of base stations is associated to form a first cluster of base stations. Each base station in the set is associated with a network. To aid in the determination of which base stations should be associated with each other, the network evaluates key performance indicators and/or usage patterns associated with each of the base stations in the network. The key performance indicators may comprise blocked calls, dropped calls, hand-off activity across technologies, and the like. Additionally, the network bases its determination on an evaluation of base station topology.

Base station clusters have several characteristics. First, base stations within a cluster are generally located in the same geographic area and provide contiguous coverage to mobile devices traveling through the area. As a corollary to this, there is generally a high rate of hand-off activity between the different base stations within a cluster. Conversely, there is generally a low rate of hand-off activity between base stations in two adjacent clusters. Second, base stations within a cluster generally have similar usage patterns. For example, base stations within a cluster may generally carry more voice calls as compared to data calls during similar periods of the day.

Once the base stations have been associated into the first cluster, at a step 412 a first step is executed of determining total estimated demand for each technology carried by each of the base stations in the first cluster. Estimated demand may be defined as the percentage of demand and the available capacity. For instance, an estimated demand of 75% may indicate that the network is not at full capacity for that technology, an estimated demand of 100% may indicate that the network is at capacity for that technology, while an estimated demand of 150% may indicate that the network has 50% more demand than available capacity for that technology. The network may determine estimated demand based on, among other things, indications of total traffic loads on RF channels communicated from the base stations to the network.

At a step 414, a second step is executed for each of the base stations in the first cluster of determining the technology that has the highest total estimated demand. This will be explained in greater depth below. At a step 416, a third step is executed of assigning to a first RF channel in the first cluster the technology for which the majority of the base stations in the first cluster have the highest total estimated demand. At a step 418, the first, second, and third steps are executed for each of the remaining RF channels in the first cluster of base stations.

An example will now be provided to better illustrate this process. The example is illustrative in nature and assumes that the cluster comprises four base stations, and that each base station in the cluster has four RF channels that carry CDMA, EvDO, and LTE technologies. The number of base stations in the cluster, the number of RF channels, and the types of technologies carried by the channels are merely exemplary. It is contemplated that the method described in FIG. 4 may be utilized for any number of base stations, RF channels and/or types of technologies.

A current state of the cluster may be described with reference to Table 1:

|  |  | RF Channels | | | |
|---|---|---|---|---|---|
|  |  | 1 | 2 | 3 | 4 |
| Base Stations | 1 | 125% | 45% | 55% | 20% |
|  | 2 | 50% | 20% | 40% | 30% |
|  | 3 | 70% | 63% | 14% | 85% |
|  | 4 | 110% | 50% | 40% | 70% |
|  |  | LTE | EvDO | CDMA | CDMA |
|  |  | Type of Technology | | | |

As seen in Table 1, channel 1 of the base stations has initially been assigned to carry LTE, channel 2 carries EvDO, and channels 3 and 4 carry CDMA. In the current state this assignment of technologies is uniform for all the base stations within a market sector.

For each base station in the cluster, the total estimated demand on each technology carried by each base station in the cluster is calculated, and the technology having the highest total estimated demand is determined for each of the base stations. The first RF channel in the cluster is assigned the technology for which the majority of the base stations in the cluster have the highest total estimated demand. This is shown in Table 2:

|  | Base Stations | | | | |
|---|---|---|---|---|---|
|  | 1 | 2 | 3 | 4 | |
| LTE | 125% | 50% | 70% | 110% | |
| EVDO | 45% | 20% | 63% | 50% | |
| CDMA | 75% | 70% | 99% | 110% | |
|  | LTE | CDMA | CDMA | CDMA | CDMA |
|  | Technology Having Highest Estimated Demand | | | | Assignment |

Referring to both Table 1 and Table 2, to determine each base station's total estimated demand on CDMA, the CDMA estimated demands from channels 3 and 4 are added. Referring now to just Table 2, the technology having the highest total estimated demand is shown for each of the base stations. For instance, LTE is in the highest demand for Base Station 1, and CDMA is in the highest demand for Base Stations 2 and 3. As shown for Base Station 4, the total estimated demands on CDMA and LTE are equal—they are both 110%. In cases of a tie such as this, the technology having the highest total estimated demand across the other base stations can be analyzed and used as a tiebreaker. In this case, both Base Station 2 and Base Station 3 have CDMA as the highest-utilized technology and, thus, CDMA is selected as the highest-utilized technology for Base Station 4. Because CDMA is utilized by three out of the four base stations, CDMA is assigned to the first RF channel for all the base stations within the cluster.

In another tie-breaker scenario where, for example, LTE is in the highest demand for Base Stations 1 and 2, and CDMA is in the highest demand for Base Stations 3 and 4, a second level of comparison may be used as the tie-breaker such as the actual values associated with the total estimated demand for the technology. By way of illustrative example using the tie-breaker scenario where LTE is in the highest demand for Base Stations 1 and 2 and CDMA is in the highest demand for Base Stations 3 and 4, the total estimated demand for LTE may be 85% for Base Station 1, and 100% for Base Station 2. The total estimated demand for CDMA may be 110% for Base Station 3, and 100% for Base Station 4. As seen, the cumulative total estimated demand for CDMA is greater than that of LTE (210% versus 185%) and, thus, CDMA is assigned to the first RF channel.

Once the first RF channel has been assigned CDMA, an amount equal to 100% (network capacity) of CDMA is subtracted from the estimated demand for that technology which may, in some cases, leave a leftover demand percentage. After this is done, the total estimated demand on each technology is analyzed again for each of the base stations, and the technology having the highest total estimated demand is determined for each of the base stations. The second RF channel in the cluster is assigned the technology for which the majority of the base stations in the cluster have the highest total estimated demand as shown below in Table 3:

|  | Base Stations | | | | |
| --- | --- | --- | --- | --- | --- |
|  | 1 | 2 | 3 | 4 | |
| LTE | 125% | 50% | 70% | 110% | |
| EVDO | 45% | 20% | 63% | 50% | |
| CDMA | 0% | 0% | 0% | 10% | |
|  | LTE | LTE | LTE | LTE | LTE |
|  | Technology Having Highest Estimated Demand | | | | Assignment |

As seen in Table 3, because CDMA has been assigned to the first RF channel, a value of 100% has been subtracted from the estimated demand attributable to CDMA for each of the base stations. However, as shown for Base Station 4, because the original estimated demand was 110%, indicating a greater demand than could be met by the network, there is still leftover demand that has not been met by the assignment of CDMA to the first RF channel. Table 3 demonstrates that LTE is now in highest demand for all of the base stations in the cluster, and, thus, the second RF channel is assigned to carry LTE.

This process is continued for the third RF channel as shown in Table 4:

|  | Base Stations | | | | |
| --- | --- | --- | --- | --- | --- |
|  | 1 | 2 | 3 | 4 | |
| LTE | 25% | 0% | 0% | 10% | |
| EVDO | 45% | 20% | 63% | 50% | |
| CDMA | 0% | 0% | 0% | 10% | |
|  | EVDO | EVDO | EVDO | EVDO | EVDO |
|  | Technology Having Highest Estimated Demand | | | | Assignment |

As seen in Table 4, 100% of the estimated demand attributable to LTE has been subtracted from the LTE total estimated demand leaving leftover demand in the case of Base Station 1 and Base Station 4. The technology now in highest demand by the majority of the base stations is EvDO, and the third RF channel has been assigned this technology.

The steps are then executed for the last remaining RF channel as demonstrated in Table 5:

|  | Base Stations | | | | |
| --- | --- | --- | --- | --- | --- |
|  | 1 | 2 | 3 | 4 | |
| LTE | 25% | 0% | 0% | 10% | |
| EVDO | 0% | 0% | 0% | 0% | |
| CDMA | 0% | 0% | 0% | 10% | |
|  | LTE |  |  | LTE | LTE |
|  | Technology Having Highest Estimated Demand | | | | Assignment |

As shown, 100% of the EvDO estimated demand has been subtracted leaving no leftover demand for EvDO. Only Base Station 1 and Base Station 4 have leftover demand. LTE is now in highest demand by Base Station 1. There is a tie in leftover demand for Base Station 4, and the technology having the highest demand (LTE) with respect to Base Station 1 is used as a tiebreaker leaving the highest total estimated demand associated with Base Station 4 attributable to LTE. LTE is in the highest demand by the majority of the base stations and, thus, the fourth RF channel is assigned LTE.

The execution of the steps outlined above may be carried out on a fixed schedule such as once per hour, once per day, once per month, and the like. Alternatively, or in addition to, the steps outlined above may be carried out on a dynamic basis in response to, for example, changes in usage patterns associated with the cluster of base stations. For example, a certain percentage of subscribers living in the area serviced by the base station cluster may have upgraded their devices in order to take advantage of certain data features. In response to this, the network may reassign technologies to the cluster's RF channels using the process set forth above in order to service the increased data usage. Dynamic reassignment may also be due to changes at the network level. For instance, the network may be increasing LTE deployment, or may have acquired additional RF spectrum bandwidth. In response to this, a technology reassignment may be executed. Any and all such aspects, and any combination thereof, are contemplated as being within the scope of the invention.

Figure 5:
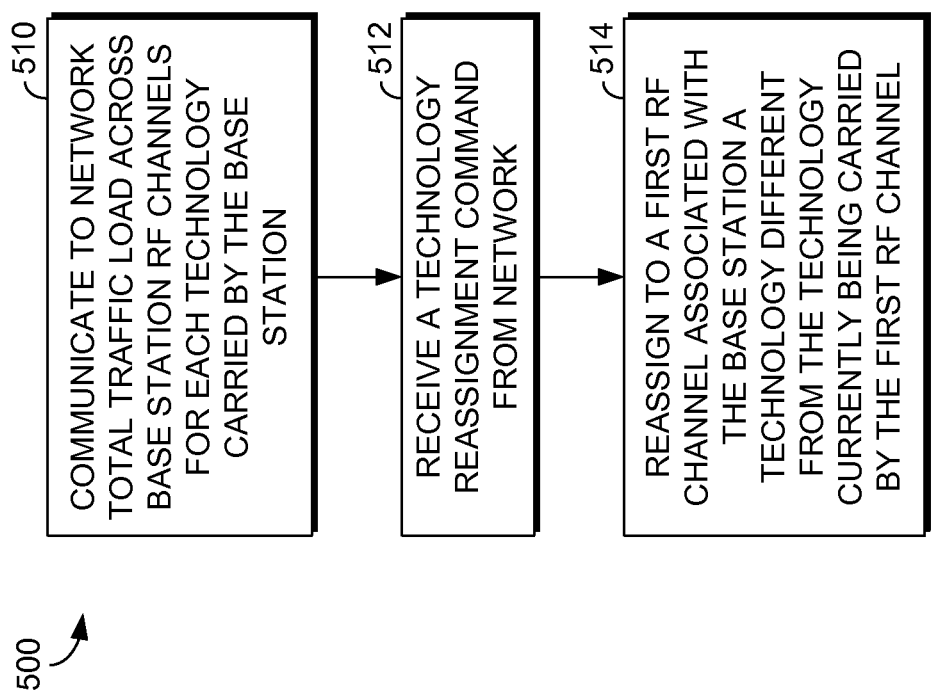
FIG. 5 depicts an illustrative flow diagram of an exemplary method of reassigning wireless-network technologies to radio-frequency channels carried by a base station according to an embodiment of the technology.

Turning now to FIG. 5, a flow diagram is depicted illustrating an exemplary method 500 of a base station reassigning technologies to its RF channels. The method 500 takes place at a base station within a network; the base station is part of a base station cluster. At a step 510, the base station communicates to its network the total traffic load across the base station's RF channels for each technology carried by the base station using, for example, a telecommunications link such as the telecommunications link 218 of FIG. 2. At a step 512, the base station receives a technology reassignment command from the network. The same reassignment command is received by each of the other base stations within the cluster. At a step 514, the base station executes the reassignment command and assigns to a first RF channel at the base station a technology that is different from the technology currently being carried by the first RF channel.

The user experience during reassignment is configured to be as seamless as possible. In one aspect, subsequent to receiving the reassignment command from the network, the base station allows an existing mobile device call on the first RF channel to terminate while preventing admission of new users on the first RF channel. After termination, a buffer period is instituted during which the technology switching is carried out. Once the technology switching is complete, the base station begins accepting new calls on the first RF channel.

Figure 6:
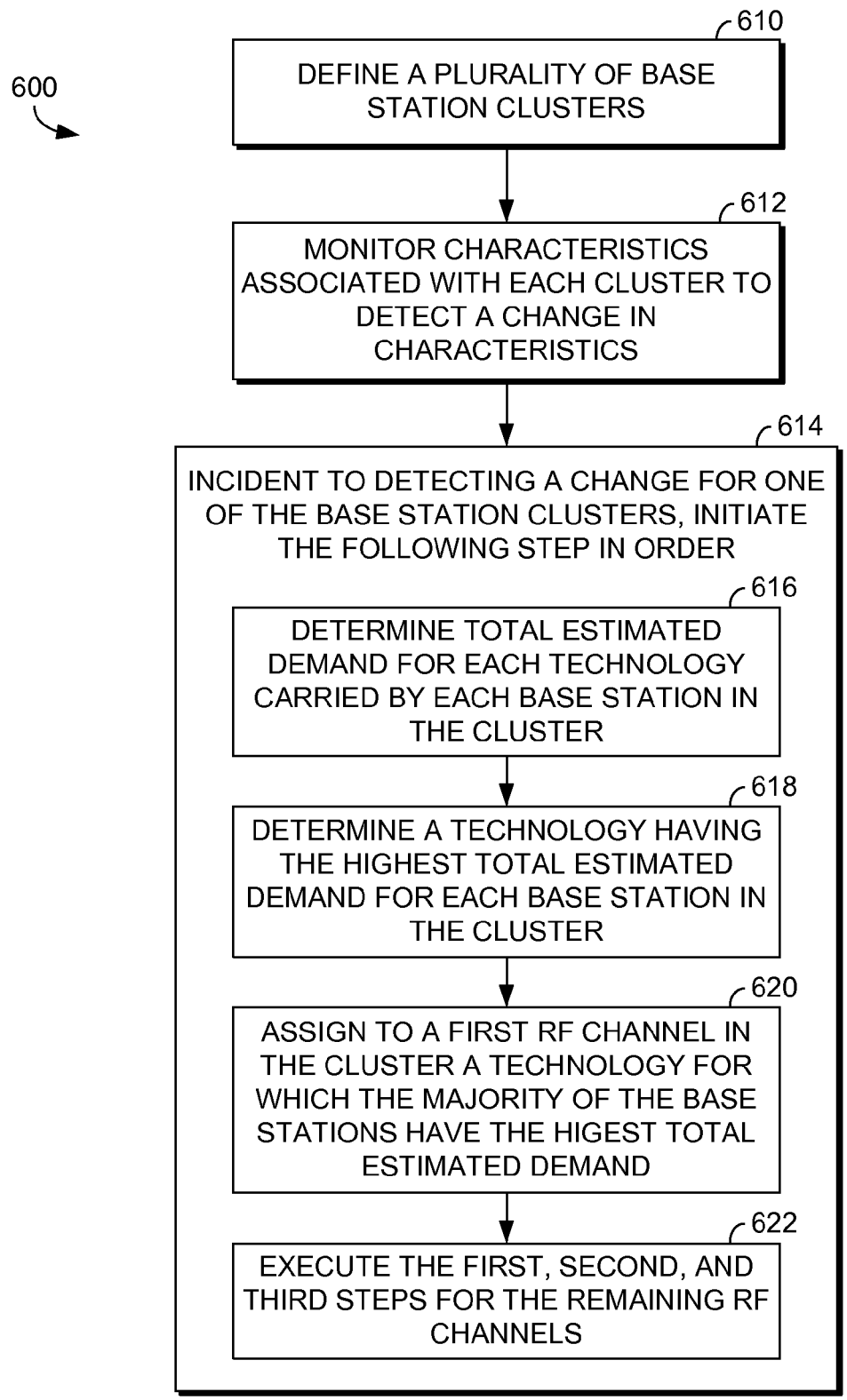
FIG. 6 depicts an illustrative flow diagram of an exemplary method of creating base station clusters and assigning wireless-network technologies to base station radio-frequency channels in the clusters according to an embodiment of the technology.

FIG. 6 depicts a flow diagram of an exemplary method 600 of assigning technologies to base station RF channels. At a step 610, a network, such as the network 314 of FIG. 3, defines a plurality of base station clusters based on, for example, an evaluation of key performance indicators, usage patterns, and network topology. This may be accomplished for all base stations within the network.

At a step 612, each base station cluster is monitored by the network to detect changes in characteristics associated with the base station cluster. Characteristics may include subscriber characteristics, mobile device characteristics, usage patterns, and the like. Incident to detecting a change in characteristics associated with a first base station cluster, the following steps are executed as indicated at step 614. At a step 616, the total estimated demand for each technology carried by each base station in the first base station cluster is determined, and, at a step 618, a technology having the highest total estimated demand is determined for each of the base stations in the first base station cluster. At a step 620, a first RF channel associated with the first cluster is assigned the technology for which the majority of the base stations in the first base station cluster have the highest total estimated demand. At a step 622, the steps 616, 618, and 620 are executed for the remaining leftover RF channels.

The monitoring process is continually carried out by the network for each base station cluster, and technology reassignment is initiated incident to detecting changes in characteristics associated with a particular base station cluster. The result of the method 600 is the optimization of RF spectrum bandwidth use across all the base stations in the network. The execution of the method 600 may occur on a fixed schedule or may occur dynamically as set forth above. Additionally, the timing of execution of the method 600 may vary from base station cluster to base station cluster.

Many different arrangements of the various components depicted, as well as components not shown, are possible without departing from the scope of the claims below. Embodiments of our technology have been described with the intent to be illustrative rather than restrictive. Alternative embodiments will become apparent to readers of this disclosure after and because of reading it. Alternative means of implementing the aforementioned can be completed without departing from the scope of the claims below. Certain features and subcombinations are of utility and may be employed without reference to other features and subcombinations and are contemplated within the scope of the claims.

What is claimed is:

1. One or more non-transitory computer-storage media having computer-executable instructions embodied thereon that, when executed by a computing device, cause the computing device to perform a method of assigning wireless-network technologies to base station radio-frequency (RF) channels, the method comprising:
   associating a first set of base stations to form a first cluster of base stations;
   assigning a specific wireless-network technology to each RF channel for each base station in the first cluster;
   for the each base station in the first cluster of base stations, a first step of determining total estimated demand for each wireless-network technology carried by the each base station;
   for the each base station in the first cluster of base stations, a second step of determining a wireless-network technology having the highest total estimated demand;
   a third step of reassigning to a first RF channel in the first cluster of base stations a wireless-network technology for which the majority of the base stations in the first cluster of base stations have the highest total estimated demand;
   a fourth step of subtracting 100% capacity from the total estimated demand of the wireless-network technology having the highest total estimated demand; and
   a fifth step of executing the first, second, third, and fourth steps by sequentially assigning a next wireless-network technology having the highest total estimated demand to a next subsequent RF channel for the remaining RF channels in the first cluster of base stations.

2. The media of claim 1, wherein the first set of base stations is associated with a wireless-telecommunications-network (the "network").

3. The media of claim 2, wherein the first set of base stations provides contiguous coverage to a mobile device associated with the network.

4. The media of claim 3, wherein associating the first set of base stations to form the first cluster of base stations comprises in part analyzing key performance indicators associated with the each base station in the first set of base stations, and wherein the key performance indicators include one or more of blocked calls, dropped calls, or handoff activity across wireless-network technologies associated with the each base station.

5. The media of claim 2, wherein the wireless-network technologies comprise at least one of Worldwide Interoperability for Microwave Access (WiMAX), Enhanced Voice-Data Optimized (EvDO), code division multiple access (CDMA), or long-term evolution (LTE).

6. The media of claim 2, wherein the first, second, third, fourth, and fifth steps are executed at least once an hour, at least once every 24 hours, or at least once every week.

7. The media of claim 2, wherein the execution of the first, second, third, fourth, and fifth steps is dependent upon at least one of network subscriber usage patterns associated with the first cluster of base stations, characteristics of mobile devices associated with the first cluster of base stations, or network policy.

8. The media of claim 2, further comprising:
   associating a second set of base stations to form a second cluster of base stations;
   for each base station in the second cluster of base stations, a first step of determining total estimated demand for each wireless-network technology carried by the each base station;
   for each base station in the second cluster of base stations, a second step of determining a wireless-network technology having the highest total estimated demand;
   a third step of reassigning to a first RF channel in the second cluster of base stations a wireless-network technology for which the majority of the base stations in the second cluster of base station have the highest total estimated demand;
   a fourth step of subtracting 100% capacity from the total estimated demand of the wireless-network technology having the highest total estimated demand; and
   a fifth step of executing the first, second, third, and fourth steps by sequentially assigning a next wireless-network technology having the highest total estimated demand to a next subsequent RF channel for the remaining RF channels in the second cluster of base stations.

9. The media of claim 8, wherein mobile device hand-off activity between the first cluster of base stations and the second cluster of base stations is minimal.

10. The media of claim 8, wherein execution of the first, second, third, fourth, and fifth steps for the second cluster of base stations is dependent upon at least one of network subscriber usage patterns associated with the second cluster of base stations, characteristics of mobile devices associated with the second cluster of base stations, or network policy.

11. The media of claim 10, wherein timing of the execution of the first, second, third, fourth, and fifth steps for the first cluster of base stations is different from timing of the execution of the first, second, third, fourth, and fifth steps for the second cluster of base stations.

12. One or more non-transitory computer-storage media having computer-executable instructions embodied thereon that, when executed by a computing device at a base station within a wireless-telecommunications network (the "network") which is currently servicing at least one mobile device call on at least a first RF channel, cause the computing device to perform of method of reassigning wireless-network technologies to radio-frequency (RF) channels carried by the base station, wherein the base station is associated with a cluster of base stations, the method comprising:

at the base station associated with the cluster of base stations:
  communicating to the network total traffic load across the base station's RF channels for each wireless-network technology carried by the base station, wherein each RF channel carries a specified wireless-network technology, wherein the network executes:
  for each base station in the cluster of base stations, a first step of determining a total estimated demand for each wireless-network technology carried by the each base station,
  for the each base station in the cluster of base stations, a second step of determining a wireless-network technology having the highest total estimated demand,
  a third step of communicating a wireless-network technology reassignment command to the each base station in the cluster of base stations, the wireless-network technology reassignment command comprising an indication of a wireless-network technology for which the majority of the base stations in the cluster of base stations have the highest total estimated demand, and
  a fourth step of subtracting 100% capacity from the total estimated demand of the wireless-network technology having the highest total estimated demand;
  receiving the wireless-network technology reassignment command from the network; and
  reassigning to the at least the first RF channel associated with the base station the wireless-network technology for which the majority of the base stations in the cluster of base stations have the highest total estimated demand.

13. The media of claim 12, wherein the each base station that is part of the cluster of base stations receives the same wireless-network technology reassignment command.

14. The media of claim 12, wherein subsequent to receiving the wireless-network technology reassignment command, allowing the mobile device call on the at least the first RF channel to terminate, instituting a buffer period within which the at least the first RF channel is reassigned to the wireless-network technology for which the majority of the base stations in the cluster of base stations have the highest total estimated demand, and subsequently accepting mobile device calls on the at least the first RF channel.

15. One or more non-transitory computer-storage media having computer-executable instructions embodied thereon that, when executed by a computing device, cause the computing device to perform a method of assigning wireless-network technologies to base station radio-frequency (RF) channels, the method comprising:

defining a plurality of base station clusters, each base station cluster of the plurality of base station clusters comprising a set of base stations;
  assigning a specified wireless-network technology for each RF channel for the each base station in the set of base stations;
  monitoring one or more characteristics associated with the each base station cluster of the plurality of base station clusters to detect a change in the one or more characteristics; and
  incident to detecting a change in the one or more characteristics associated with a first base station cluster of the plurality of base station clusters, initiating the following steps in order:
    (A) a first step of determining total estimated demand for each wireless-network technology carried by the each base station in the first base station cluster;
    (B) a second step of determining a wireless-network technology having the highest total estimated demand for the each base station in the first base station cluster;
    (C) a third step of reassigning to a first RF channel in the first base station cluster a wireless-network technology for which the majority of the base stations in the first base station cluster have the highest total estimated demand;
    (D) a fourth step of subtracting 100% capacity from the total estimated demand of the wireless-network technology having the highest total estimated demand; and
    (E) a fifth step of executing the first, second, third, and fourth steps by sequentially assigning a next wireless-network technology having the highest total estimated demand to a next subsequent RF channel for the remaining RF channels in the first base station cluster.

16. The media of claim 15, wherein the each base station cluster has minimal hand-off activity with each remaining base station cluster of the plurality of base station clusters.

17. The media of claim 15, wherein the one or more characteristics comprise subscriber characteristics associated with a respective base station cluster of the plurality of base station clusters.

18. The media of claim 15, wherein the one or more characteristics comprise mobile device characteristics associated with the respective base station cluster of the plurality of base station clusters.

19. The media of claim 15, wherein a number of base stations associated with each base station cluster of the plurality of base station cluster is between 4 and 8 base stations.

* * * * *